(12) United States Patent
Chander et al.

(10) Patent No.: US 7,174,177 B1
(45) Date of Patent: Feb. 6, 2007

(54) SYSTEM AND METHOD FOR PROVIDING INDICATION OF MAXIMUM TELESERVICE PAYLOAD SIZE IN A WIRELESS COMMUNICATION NETWORK

(75) Inventors: Sharat Subramaniyam Chander, Woodbridge, IL (US); Shiv Mohan Seth, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/480,013

(22) Filed: Jan. 10, 2000

(51) Int. Cl.
*H04Q 7/20* (2006.01)

(52) U.S. Cl. ............... 455/466; 455/412.1; 455/414.1; 455/435.1; 340/7.24; 340/7.43

(58) Field of Classification Search ............... 455/466, 455/414, 426, 458, 453, 433, 445, 560, 561; 370/235, 236, 312, 395.1, 395.32, 395.41
See application file for complete search history.

(56) References Cited

U.S. PATENT DOCUMENTS

| | | | | |
|---|---|---|---|---|
| 5,805,997 A | * | 9/1998 | Farris | 455/461 |
| 5,822,700 A | | 10/1998 | Hult et al. | 455/466 |
| 6,097,961 A | * | 8/2000 | Alanara et al. | 455/466 |
| 6,167,261 A | | 12/2000 | Amin | 455/426 |
| 6,185,208 B1 | * | 2/2001 | Liao | 370/392 |
| 6,263,212 B1 | * | 7/2001 | Ross et al. | 455/466 |
| 6,317,601 B1 | * | 11/2001 | Agarwal et al. | 455/453 |
| 6,400,942 B1 | * | 6/2002 | Hansson et al. | 455/426.1 |
| 6,411,810 B1 | * | 6/2002 | Maxemchuk | 455/453 |
| 6,434,393 B1 | * | 8/2002 | Einola | 455/458 |

FOREIGN PATENT DOCUMENTS

| CA | 2282443 | 10/2003 |
|---|---|---|
| EP | 0 936 825 A2 | 8/1999 |

OTHER PUBLICATIONS

Digital cellular telecommunications system (Phase 2+); ETSI TS 100 901 V7.3.0 (Nov. 1999).

* cited by examiner

*Primary Examiner*—Charles R. Craver (57) ABSTRACT

A system and method for providing improved teleservice messaging to a mobile station in a wireless communication network are disclosed. In preferred embodiments, an indication is provided to a network sending entity of the maximum teleservice payload size that can be sent by the network sending entity to the mobile station via network receiving entities serving the mobile station. The payload size indication is utilized by the network sending entity to format the size of teleservice messages sent by the network sending entity to the mobile station via the network receiving entities.

42 Claims, 5 Drawing Sheets

SYSTEM AND METHOD FOR PROVIDING INDICATION OF MAXIMUM TELESERVICE PAYLOAD SIZE IN A WIRELESS COMMUNICATION NETWORK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to teleservice messaging in a wireless communication network. More particularly, the invention concerns a system and method for providing an indication of maximum teleservice payload size to a teleservice message sending entity in order to avoid resegmentation and retransmission delays.

2. Description of the Prior Art

Teleservice messaging is a form of communication that allows information payloads (e.g. displayable text, graphics, executables, etc.) to be sent to mobile wireless communication devices (e.g., cellular telephones) in manageable form. This type of messaging can be found in many species of wireless telecommunication systems, including those designed according to the TIA/EIA-41-D standard, the IS-2000 standard, the GSM standard, the UMTS standard, the IMT-2000 standard, and others. When a Mobile Station (MS), such as a wireless telephone, a wireless Personal Digital Assistant (PDA) or any other device capable of disseminating teleservice messages, is sent teleservice messages containing a payload by a network sending entity, such as a Short Message Service (SMS) Center (SMSC), a Message Center (MC), a Wireless Application Protocol (WAP) Server, or any other content provider, no regard is given to payload size constraints of the network receiving entities that serve the MS, such as the Mobile Switching Center (MSC), the Base Station (BS), or other entities. If one (or more) of the network receiving entities cannot handle the payload size, the network sending entity must be informed of the problem, and it must then resegment the payload into smaller information units and resend them. This causes delay and needlessly ties up network resources.

Accordingly, a solution to the forgoing problem is required that enables teleservice payloads to always be sent in information unit sizes that can be accommodated by network receiving entities, such that message resegmentation and retransmission due to excessive payload size are avoided.

SUMMARY OF THE INVENTION

The foregoing problems are solved and an advance in the art is obtained by a novel system and method for providing improved teleservice messaging to a mobile station in a wireless communication network. In accordance with the invention, an indication is provided to a network sending entity of the maximum teleservice payload size that can be sent by the network sending entity to the mobile station via network receiving entities serving the mobile station. The payload size indication is utilized by the network sending entity to format the size of teleservice messages sent by the network sending entity to the mobile station via the network receiving entities, such that resegmentation and retransmission are avoided.

Network sending entities (e.g. SMSCs, MCs, WAP servers, etc.) that send teleservice layer messages containing a payload (e.g., displayable text such as SMS messages, displayable text and graphics such as WML (WAP Markup Language) documents, and executables such as WAP Java applets, etc.) can thus be advised of the maximum payload size (e.g., in bits, bytes, data units, etc.) that can be handled by network receiving entities in the wireless network that serve a mobile station (e.g., MSCs, BSs, etc.), on a per message basis. This information is used by the network sending entity to appropriately segment the total payload into manageable packages (at the teleservice layer) prior to sending them on to the network receiving entities. This enables efficient use of transmission media and avoids retransmissions of correctly sized packages which otherwise may need to be done by trial and error.

In preferred embodiments of the invention, the payload size indication is provided from one of the network receiving entities to the network sending entity. Most preferably, the payload size indication is provided from one of the network receiving entities to the sending network entity via a database associated with the mobile station. The receiving network entity providing the payload size indication could be an MSC acting as a voice communication switch on behalf of the mobile station. If data communication is involved, the receiving network entity sending the payload size indication could be a Mobile Data Intermediate System (MDIS) or a Serving GPRS Support Node (SGSN). The database could be the mobile station's Home Location Register (HLR).

The payload size indication is preferably provided from one of the network receiving entities to the database as a message parameter during standard registration message exchange between the network receiving entity and the database during operations of the wireless network. Similarly, the payload size indication is preferably provided from the database to the network sending entity as a message parameter during routine registration message exchange between the database and the network sending entity.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE
PREFERRED EMBODIMENT

Figure 1:
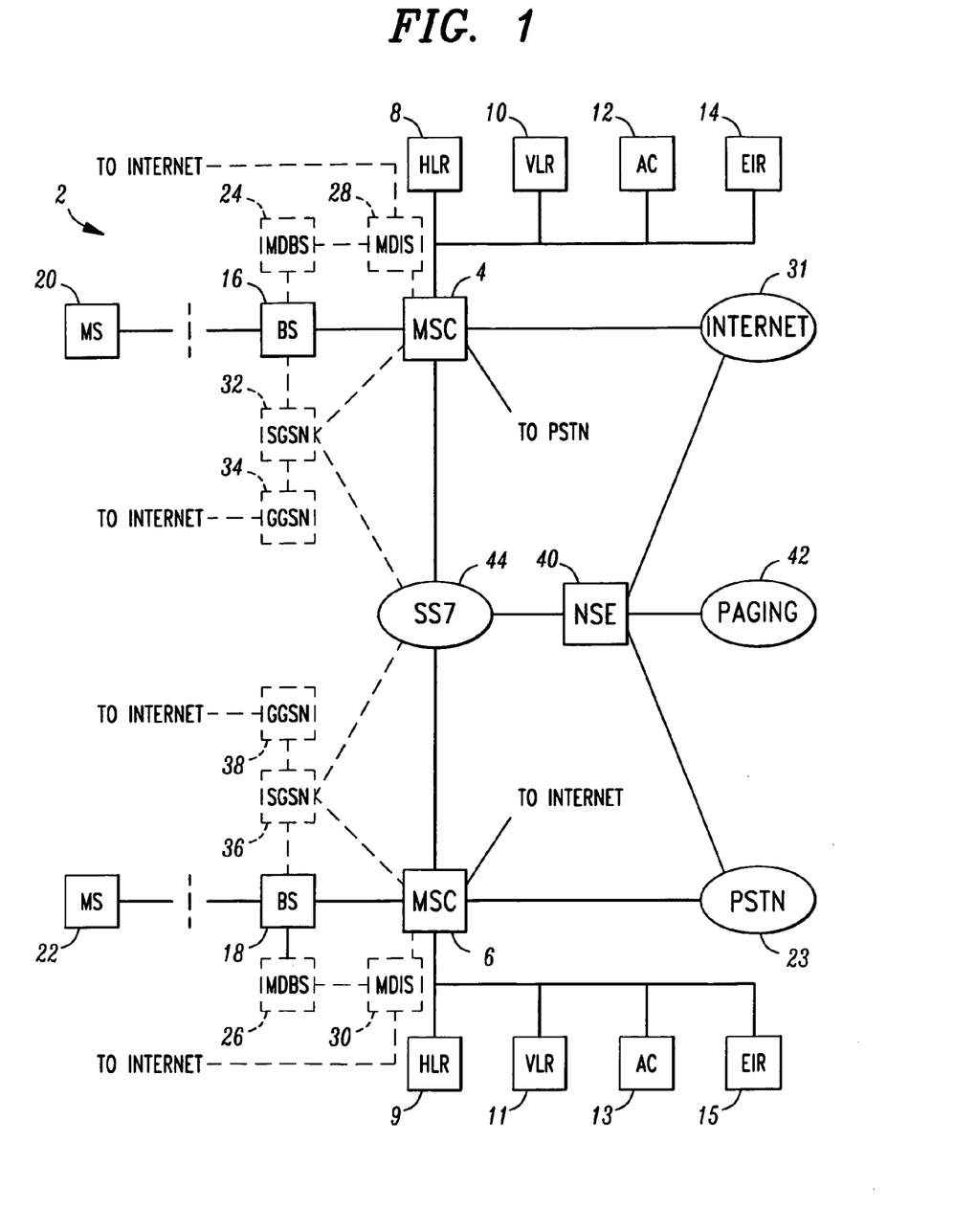
FIG. 1 is a functional block diagram showing a wireless communication system constructed in accordance with the invention.

Turning now to the figures, wherein like reference numerals represent like elements in all of the several views, FIG. 1 illustrates a functional representation of an exemplary wireless communication system 2 constructed in accordance with preferred embodiments of the invention. FIG. 1 is intended to be generic in nature and not limited to any particular wireless network standard. Indeed, the wireless system 2 may be implemented using any of the wireless network standards now in existence, such as TIA/EIA-41-D, IS-2000 or GSM, or which may be adapted in the future, such as UMTS, IMT-2000 or the like. Moreover, as described below, the wireless system 2 may be adapted to carry voice traffic, data traffic or both.

As is known in the art, the wireless system 2 includes a plurality of wireless service areas, each of which is managed by the usual wireless network serving entities, including an MSC and one or more BSs. FIG. 1 illustrates two wireless service areas that are respectively managed by the MSC 4 and the MSC 6. Associated with each MSC are the usual Home Location Register (HLR), Visitor Location Register (VLR), Authorization Center (AC) and Equipment Identity Register (EIR), all of which, with the exception of the invention-related enhancements described below, are conventional in nature. In FIG. 1, it will be seen that the MSC 4 is associated with an HLR 8, a VLR 10, an AC 12 and an EIR 14, and that the MSC 6 is associated with an HLR 9, a VLR 11, an AC 13 and a EIR 15.

As is further known in the art, each MSC supports a plurality of BSs, each of which conducts wireless communications in an assigned geographic coverage area commonly referred to as a cell. FIG. 1 illustrates two such BSs; namely, the BS 16 connected to the MSC 4 and the BS 18 connected to the MSC 6. Each BS includes radio transceiver equipment for communicating in conventional fashion over an air interface with a plurality of MSs, which could be cellular telephones, wireless computing devices such as PDAs, or other radio communication equipment. FIG. 1 illustrates two such MSs; namely, the MS 20 communicating with the BS 16 and the MS 22 communicating with the BS 18.

In the wireless network 2, the MSCs 4 and 6 act as switching nodes for respectively communicating voice traffic on behalf of the MSs 20 and 22 over the circuit-switched PSTN 23. In association with the usual data network gateway equipment (not shown) the MSCs 4 and 6 may also communicate voice traffic (VoIP) over the public Internet 31. The wireless network 2 may also be adapted to carry data traffic (e.g., over the Internet 31) on behalf of MSs that are equipped for wireless data communication. There are several wireless data standards in use today, with the most prevalent being the Cellular Digital Packet Data (CDPD) and General Packet Radio Service (GPRS) standards.

The wireless network 2 can be adapted to implement the CDPD standard by adding a plurality of Mobile Data Base Stations (MDBSs) and a Mobile Data Intermediate System switch (MDIS) in one or more of the wireless service areas. These entities are analogous to, and are typically associated with, the existing voice-oriented BSs and MSCs. The MDBSs communicate with the MSs over an air interface and the MDISs provide connectivity to a data network, such as the Internet 31. Thus, in FIG. 1, the wireless network 2 may include an MDBS 24 associated with the BS 16, and an MDBS 26 associated with the BS 18. Likewise, the wireless network 2 may include an MDIS 28 associated with the MSC 4 and an MDIS 30 associated with the MSC 6, each of which connect to the Internet 31. In combination, the MDBS 24 and the MDIS 28 provide data communication support on behalf of the MS 20, while the MDBS 26 and the MDIS 30 provide data communication support on behalf of the MS 22.

The wireless network 2 can be adapted to implement the GPRS standard by adding a plurality of Serving GPRS Support Nodes (SGSNs) and a Gateway GPRS Support Node (GGSN) in one or more wireless service areas. Each SGSN is typically connected to a voice-oriented or packet data-oriented BS and MSC, and each GGSN is usually connected to a data network, such as the Internet 31. Thus, in FIG. 1, the wireless network 2 may include an SGSN 32 and GGSN 34 associated with the wireless service area managed by the MSC 4, and an SGSN 36 and GGSN 38 associated with the wireless service area managed by the MSC 6. In combination, the SGSN 32 and the GGSN 34 provide data communication support on behalf of the MS 20, while the SGSN 36 and the GGSN 38 provide data communication support on behalf of the MS 22.

As is conventional, the MSs 20 and 22 have teleservice messaging capability, which allows them to retrieve teleservice payloads from a Network Sending Entity (NSE) 40 that communicates with the MSs via receiving network entities in the wireless network 2, such as the MSCs and the BSs. The NSE 40 could be any network sending entity supporting any service that requires the sending of large blocks of information requiring segmentation in order to be delivered to the MSs. For example, the teleservice messages sent by the NSE 40 could include SMS messages, Unstructured Supplementary Service Data (USSD) messages, Circuit Switched Data (CSD) messages, CDPD messages and GPRS messages. More specifically, one kind of network sending entity that could be represented by the NSE 40 is an SMS Message Service Center (SMSC) sending SMS messages. An SMSC acting on behalf of the MSs 20 and 22 could provide teleservice messages to the MSs that pertain to communications received from the PSTN 23 (e.g., voice mail messages), the Internet 31 (e.g., email messages), and/or from other sources, such as a paging network 42 (e.g., paging messages). These messages would typically be provided to the MSs 20 and 22 via the intelligent network (e.g., SS7) portion 44 of the PSTN 23. Another network sending entity that could be represented by the NSE 40 is an Over-The-Air-Function (OTAF) used for provisioning wireless service (e.g., activating subscribers), downloading Preferred Roaming Lists (indicating the systems from which a roamer would prefer to receive service), and other functions. Still another network sending entity that could be represented by the NSE 40 is a WAP server operating in accordance with the WAP standard.

In general, the network receiving entities that serve the MSs will vary depending on the message source and type. Circuit-based teleservice layer messages would normally be distributed to the MSs through the MSCs and the BSs. Packet-based teleservice layer messages may be distributed to the MSs through the MDISs (for CDPD data), or the SGSNs (for GPRS data), together with the BSs.

As stated, the network sending entities used in prior art wireless network systems format teleservice layer messages without knowledge of payload size constraints in the network receiving entities serving the mobile stations. The solution provided in accordance with preferred embodiments of the present invention entails the inclusion of an attribute in standard wireless network registration messages (e.g., a RegistrationNotification message according to the TIA/EIA-41-D standard) that allows the network sending entity to determine the maximum teleservice payload size that can be handled by the receiving network entities (e.g., MSCs, BSs, etc.). These standard registration messages that are modified to incorporate a teleservice payload size attribute include (1) registration messages that are first exchanged between a network receiving entity serving an mobile station (e.g., an MSC) and a database associated with the mobile station (e.g., an HLR), and (2) registration messages that are thereafter exchanged between the database and the network sending entity. More particularly, the first group of registration messages provide the teleservice payload size information from the serving network receiving entity to the database, where the information is stored, and the second group of registration messages provide the teleservice payload size information from the database to the network sending entity. The network sending entity will then be able to use this information on large messages in order to segment them into units of appropriate size.

To illustrate, consider the wireless telecommunication system of FIG. 1 wherein network entities, such as the MSC 4 or 6, the BS 16 or 18, and the HLR 8 or 9 (among others) are involved in providing voice services to a network subscriber operating one of the MSs 20 or 22. In that case, when the subscriber powers-on the MS, roams to a new service area (MSC/BS), originates a call, responds to a page for an incoming call, or in any other way accesses the wireless network 2, a registration process typically ensues. Registration results in the serving MSC informing the HLR assigned to the MS of the MS's presence in its sphere of influence. The HLR retains this information and will in turn forward the information upon request to the NSE 40, so that the NSE can forward incoming messages to the target MS 20 or 22, as in the case of mobile-terminated SMS.

Following are specific examples illustrating how teleservice payload size information can be provided to an NSE. All of the examples below are based on conventional registration messages currently in use according to the TIA/EIA-41-D wireless network intersystem operators standard. Appended to certain of these messages is a TS_DataSize parameter that indicates the maximum teleservice payload size that can be handled in a wireless service area managed by an MSC, an MDIS or a GGSN. Advantageously, no special payload size queries or processing are required. The teleservice payload size information, which is equipment-specific, can be input at system deployment time by a system administrator into a parameter database of the type conventionally associated with MSCs, MDIS and GGSNs for storing basic operating information.

In the following examples, the set of parameters shown in addition to the TS_DataSize attribute are not necessarily inclusive. They are set forth for the purpose of illustration only based on existing standards. Persons skilled in the art will appreciate that the parameters shown may be augmented (or altered) in the future.

EXAMPLE 1

Authentication on Initial Access

Figure 2:
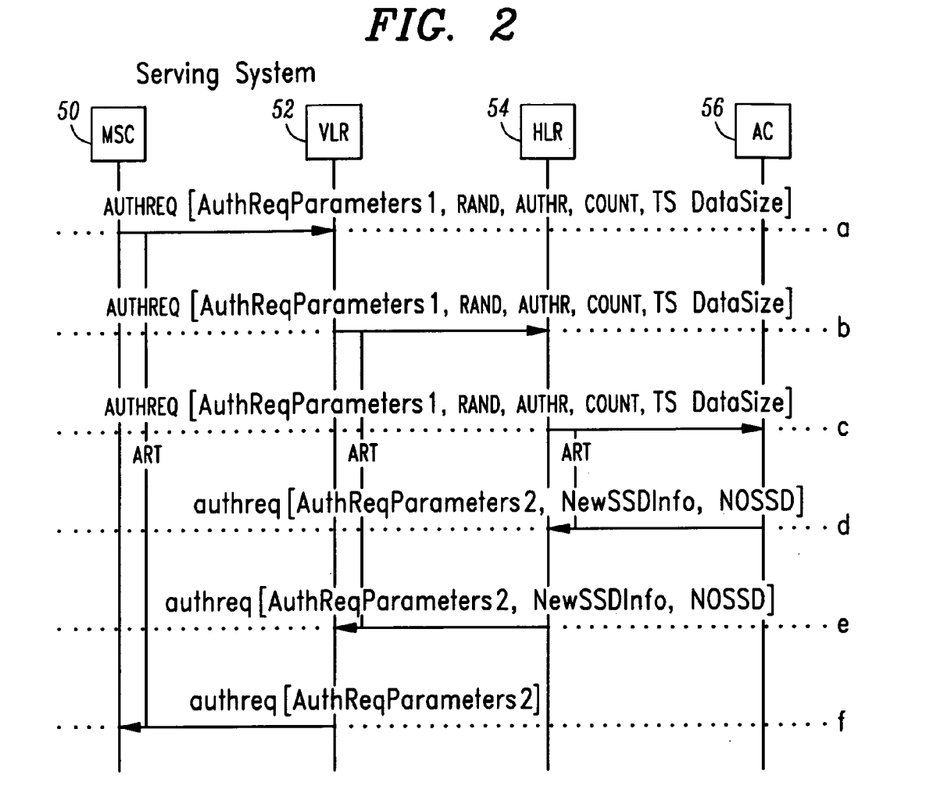
FIG. 2 is an information flow diagram showing an AuthenticationRequest operation using a maximum teleservice payload size indicator in accordance with the invention.

This operation scenario describes the successful use of an AuthenticationRequest operation to authenticate an MS, which is attempting initial access to a serving MSC. The MS is aware that authentication is required on all system accesses. The result of the operation is to allow access. As shown in Step "a" of FIG. 2, during the initial access attempt by the authentication-capable MS (not shown), the serving MSC 50 sends an AUTHREQ message to a serving VLR 52. This message contains the following parameters, all of which are conventional save for the TS_DataSize parameter, which is added in accordance with the invention:

| Parameters | Usage | Type |
| --- | --- | --- |
| AuthReqParameters1: | Set of parameters in AUTHREQ: | |
| [MIN] | Served MS MIN. | R |
| [ESN] | Served MS ESN. | R |
| [MSCID] | Serving MSC MSCID. | R |
| [PC_SSN] | Serving MSC PC_SSN. Include if SS7 carriage services are used. | O |
| [SystemCapabilities] | Authentication capabilities of Serving MSC. | R |
| [SystemAccessType] | Type of system access = registration. | R |
| [TerminalType] | Identifies the radio frequency interface standard supported by the associated MS | R |
| RAND | Random number derived from MS-provided RANDC by Serving MSC. | R |
| AUTHR | Authentication result provided by MS. | R |
| COUNT | Value of CallHistoryCount provided by MS. | R |
| TS DataSize | Maximum size of Teleservice payload | O |

As shown in Step "b" of FIG. 2, the VLR 52 sends an AUTHREQ message to an HLR 54 associated with the MS. The parameters are the same as in Step "a" of FIG. 2, but include the following conventional modifications:

| Parameters | Usage | Type |
| --- | --- | --- |
| [SystemCapabilities] | Authentication capabilities of Serving VLR. | R |
| [PC_SSN] | Serving VLR PC_SSN. Include if SS7 carriage services are used. | O |

As shown in Step "c" of FIG. 2, the HLR 54 forwards the AUTHREQ message to an AC 56 associated with the MS. The parameters are the same as in Step "b" of FIG. 2.

In Step "d" of FIG. 2, the AC 56 determines that the MS should be allowed access and sends an authreq message to the HLR 54. The message parameters, all of which are conventional, are as follows:

| Parameters | Usage | Type |
| --- | --- | --- |
| AuthReqParameters2: | Set of parameters in authreq: | |
| [CallHistoryCount] | Event counter used for clone detection. Included if SSD is shared. | O |

-continued

| Parameters | Usage | Type |
|---|---|---|
| [RANDSSD] | Random number for SSD generation. Included if a SSD update and a Unique Challenge to the MS should be initiated by the serving system. | O |
| [RANDU] | Random number generated by AC to produce AUTHU. Included if a Unique Challenge to the MS should be initiated by the serving system. | O |
| [AUTHU] | Expected MS response to Unique Challenge Order as calculated by AC. Included if a Unique Challenge to the MS should be initiated by the serving system. | O |
| [UpdateCount] | Indicates that the COUNT update procedure should be initiated by the serving system. | O |
| NewSSDInfo: | New SSD information: | |
| [Authentication-AlgorithmVersion] | Include if SSD included to select authentication algorithm other than default. | O |
| [SSD] | New value of VLR and AC shared secret data. May be included if the SystemCapabilities of the VLR include "CAVE execution" and AC administration policies allow distribution of the SSD. | O |
| NOSSD | Indicates that previously provided SSD is no longer valid and should be discarded. | O |

In step "e" of FIG. 2, the HLR 54 forwards the authreq message to the VLR 56. The parameters are the same as for step "d" of FIG. 2.

In step "f" of FIG. 2, the serving VLR forwards the authreq message to the MSC 50. The parameters are the same as in step d of FIG. 2, except that the SSD, AAV and NOSSD parameters are not included, as is conventional.

EXAMPLE 2

Direct FeatureRequest with Call Routing

Figure 3:
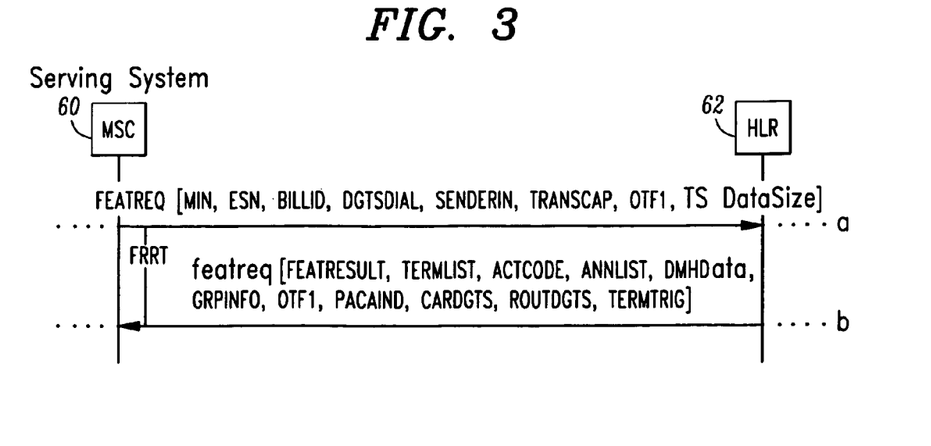
FIG. 3 is an information flow diagram showing a FeatureRequest operation using a maximum teleservice payload size indicator in accordance with the invention.

This operation scenario describes a normal FeatureRequest operation when the response from an HLR includes instructions for the serving system to set up a call. As shown in step "a" of FIG. 3, a feature code string (i.e., a string of digits including a feature code) received from an MS (not shown) are included in a FEATREQ message and sent by a serving MSC 60 to an HLR 62 associated with the MS. The message parameters, which are otherwise conventional, include a TS_DataSize parameter in accordance with the invention, as follows:

| Parameters | Usage | Type |
|---|---|---|
| MIN | Served MS MIN. | R |
| ESN | Served MS ESN. | R |
| BILLID | Call ID. Used for billing and redirection purposes when FEATREQ results in call routing. | R |
| DGTSDIAL | Feature code string entered by served MS. | R |
| SENDERIN | Identification number of the sending node. | R |
| TRANSCAP | Indicates the serving system's transaction capability at the current time. | R |
| OTFI | Indicates the current feature activation status. | O |
| TS DataSize | Maximum size of Teleservice payload | O |

In step "b" of FIG. 3, the HLR 62 determines the appropriate feature treatment based on the received information and returns this in a featreq message. In this scenario, the response from the HLR 62 includes instructions for the serving system to set up the call. The featreq message has the following conventional parameters:

| Parameters | Usage | Type |
|---|---|---|
| FEATRESULT | Feature request result. | R |
| TERMLIST | Call termination information. | R |
| ACTCODE | Treatment for served MS. If not included, treatment is based on FEATRESULT value. | O |
| ANNLIST | List of tones or announcements to play. If not included, announcement is based on FEATRESULT value. | O |
| DMHData: | Data for DMH recording purposes: | |
| [DMH_AccountCode-Digits] | Include if applicable. | O |
| [DMH_Alternate-BillingDigits] | Include if applicable. | O |
| [DMH_BillingDigits] | Include if applicable. | O |
| [MobileDirectory-Number] | Include if applicable. | O |
| GRPINFO | Information associated with group routing. | O |
| OTFI | Indicates the current feature activation status. | O |
| PACAIND | Indicates PACA priority level. | O |
| CARDGTS | Calling subscriber's PIC. Include if applicable and if not specified within the TerminationList parameter. | O |
| ROUTDGTS | Special routing instructions. Include if applicable and if not specified within the TerminationList parameter. | O |
| TERMTRIG | Indicates active termination trigger points. | O |

EXAMPLE 3

Successful Location Request

Figure 4:
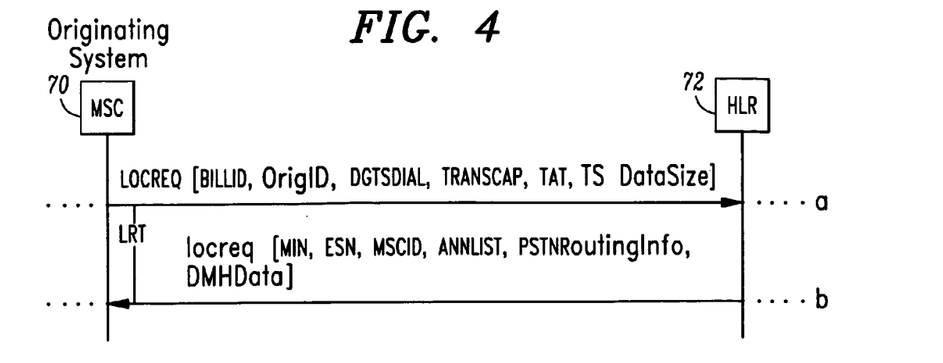
FIG. 4 is an information flow diagram showing a LocationRequest operation using a maximum teleservice payload size indicator in accordance with the invention.

This operation scenario describes a LocationRequest operation when the call treatment is to route the call to a PSTN directory number. As shown in step "a" of FIG. 4, an originating MSC 70 sends a LOCREQ message to an HLR 72 associated with the MS (not shown). This association is made through the dialed MS address digits (which may not be the MIN). The message parameters, which are otherwise conventional, include a TS_DataSize parameter in accordance with the invention, as follows:

| Parameters | Usage | Type |
|---|---|---|
| BILLID | Call ID. Used for billing and redirection purposes when LOCREQ results in call routing. | R |
| OrigID: | Originating MSC's identification information: | |
| [MSCID] | Originating MSC MSCID. | R |
| [PC_SSN] | Originating MSC PC_SSN. Include if SS7 carriage services are used. | O |
| [SystemMyTypeCode] | Originating MSC vendor identification. | MBC |
| DGTSDIAL | Digits identifying called party. | R |
| TRANSCAP | Indicates the originating system's transaction capability at the current time. | O |
| TAT | TerminationAccessType identifying special access situations. Include if applicable. | O |
| TS DataSize | Maximum size of Teleservice payload | O |

In step "b" of FIG. 4, the HLR 72 determines that the call shall be routed to a PSTN directory number and returns this information to the Originating MSC in the locreq message, having the following conventional parameters:

| Parameters | Usage | Type |
|---|---|---|
| MIN | Called MS MIN. | R |
| ESN | Called MS ESN. | R |
| MSCID | Serving MSC's MSCID. | R |
| ANNLIST | List of tones or announcements to play. If not included, announcement is based on other parameters in response. | O |
| PSTNRoutingInfo: | Call routing information: | |
| [TerminationList] | Network termination information. Include if TerminationList is allowed. | O |
| [Digits(Destination)] | PSTN DN for use in call routing. Include if TerminationList is not allowed. | O |
| [RoutingDigits] | Special routing instructions. Include if applicable and if not specified within the TerminationList parameter. | O |
| [Digits(Carrier)] | Called subscriber's PIC. Include if applicable and if not specified within the TerminationList parameter. | O |
| DMHData: | Data for DMH recording purposes: | |
| [DMH_AccountCode-Digits] | Include if applicable. | O |
| [DMH_Alternate-BillingDigits] | Include if applicable. | O |
| [DMH_BillingDigits] | Include if applicable. | O |
| [MobileDirectory-Number] | Include if applicable. | O |
| [DMH_Redirection-Indicator] | Include if applicable. | R |

EXAMPLE 4

Successful OriginationRequest

Figure 5:
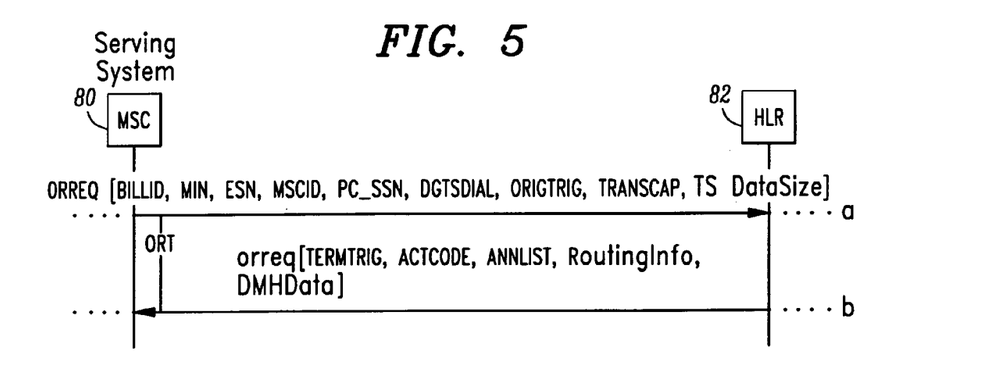
FIG. 5 is an information flow diagram showing an OriginationRequest operation using a maximum teleservice payload size indicator in accordance with the invention.

This operation scenario describes an OriginationRequest operation when a call origination request is successful. As shown in step "a" of FIG. 5, dialed digits are included in an ORREQ message and sent by a serving MSC 80 to an HLR 82 associated with an MS (not shown). The message parameters, which are otherwise conventional, include a TS_DataSize parameter in accordance with the invention, as follows:

| Parameters | Usage | Type |
|---|---|---|
| BILLID | Call ID. Used for billing and redirection purposes when ORREQ results in call routing. | R |
| MIN | Served MS MIN. | R |
| ESN | Served MS ESN. | R |
| MSCID | Serving MSC MSCID. | R |
| PC_SSN | Serving MSC PC_SSN. Include if SS7 carriage services are used. | O |
| DGTSDIAL | Digits, entered by served MS, which identify the called party. | R |
| ORIGTRIG | Indicates the origination trigger responsible for the operation invocation. | R |
| TRANSCAP | Indicates the Serving MSC's transaction capabilities at the current time. | R |
| TS DataSize | Maximum size of Teleservice payload | O |

As shown in step "b" of FIG. 5, the HLR 82 determines that the origination request be approved and returns routing instructions in the orreqeq message, containing the following conventional parameters:

| Parameters | Usage | Type |
|---|---|---|
| TERMTRIG | Termination trigger points currently active for the MS. Include if applicable. | O |
| ACTCODE | Include if action to be performed is not implied through presence of other parameters. | O |
| ANNLIST | List of tones or announcements to play. If not included, announcement is based on other parameters in response. | O |
| RoutingInfo: | Call routing information: | |
| [TerminationList] | Call termination information. | R |
| [RoutingDigits] | Special routing instructions. Include if applicable and if not specified within the TerminationList parameter. | O |
| [CarrierDigits] | Calling subscriber's PIC. Include if applicable and if not specified within the TerminationList parameter. | O |
| DMHData: | Data for DMH recording purposes: | |
| [DMH_AccountCode-Digits] | Include if applicable. | O |
| [DMH_Alternate-BillingDigits] | Include if applicable. | O |
| [DMH_BillingDigits] | Include if applicable. | O |
| [DMH_Redirection-Indicator] | Include if applicable. | R |
| [MobileDirectory-Number] | Include if applicable. | O |

EXAMPLE 5

Successful QualificationRequest

Figure 6:
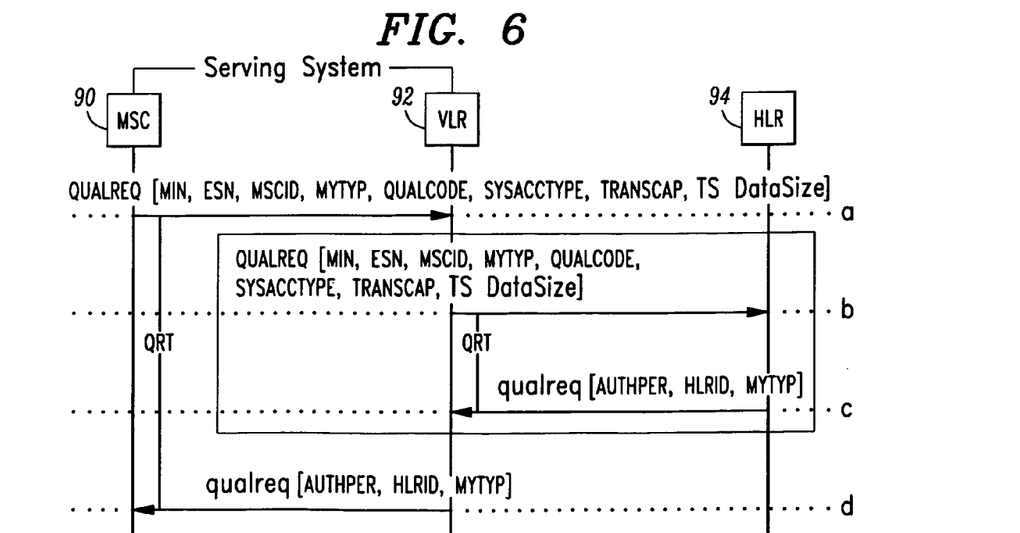
FIG. 6 is an information flow diagram showing a QualificationRequest operation using a maximum teleservice payload size indicator in accordance with the invention.

This operation scenario describes a QualificationRequest operation when authorization is confirmed and no profile is requested. As shown in step "a" of FIG. 6, after determining that a roaming MS (not shown) is within its service area, a serving MSC 90 sends a QUALREQ message to its VLR 92. The MSC 90 may detect the MS's presence through autonomous registration, call origination, call termination (i.e. a page response following a call to the roamer port) or a service order. The message, which is otherwise conventional, includes a TS_DataSize parameter in accordance with the invention, as follows:

| Parameters | Usage | Type |
|---|---|---|
| MIN | Served MS MIN. | R |
| ESN | Served MS ESN. | R |
| MSCID | Serving MSC MSCID. | R |
| MYTYP | Serving MSC vendor identification. | MBC |
| QUALCODE | Type of request = validation only. | R |
| SYSACCTYPE | Indicates the type of system access. | R |
| TRANSCAP | Indicates the serving system's transaction capability at the current time. | R |
| TS DataSize | Maximum size of Teleservice payload | O |

If the MS had previously registered with the MSC 90 (or any other MSC within the domain of the VLR 92), the VLR 92 may take no further action other than to record the identity of the MSC 90 currently serving the MS and proceed to step "d" of FIG. 6. If the MS is unknown to the VLR 92, or if the information requested by the MSC 90 is not available at the VLR 92, the VLR 92 sends a QUALREQ message to an HLR 94 associated with the MS, as shown in step "b" of FIG. 6. The message parameters are the same as in step "a" of FIG. 6, and also include the following additional conventional parameters:

| Parameters are as in Step-a, with the following modifications: | | |
|---|---|---|
| Parameters | Usage | Type |
| MYTYP | VLR vendor identification. | MBC |

In step "c" of FIG. 6, the HLR 94 determines that authorization can be granted to the MS and returns this indication to the VLR 92 in a qualreq message, containing the following conventional parameters:

| Parameters | Usage | Type |
|---|---|---|
| AUTHPER | Authorization confirmed indication with period of authorization. | R |
| HLRID [MSCID] | HLR MSCID to key MS record against for a subsequent UnreliableRoamerDataDirective. | R |
| MYTYP | HLR vendor identification. | MBC |

In step "d" of FIG. 6, the VLR 92 sends a qualreq message to the MSC 90 containing the same parameters as in step "c" of FIG. 6, with the following conventional modifications:

| Parameters | Usage | Type |
|---|---|---|
| HLRID [MSCID] | HLR MSCID. Include if received in Step-c. | O |
| MYTYP | VLR vendor identification. | MBC |

EXAMPLE 6

Successful RegistrationNotification

Figure 7:
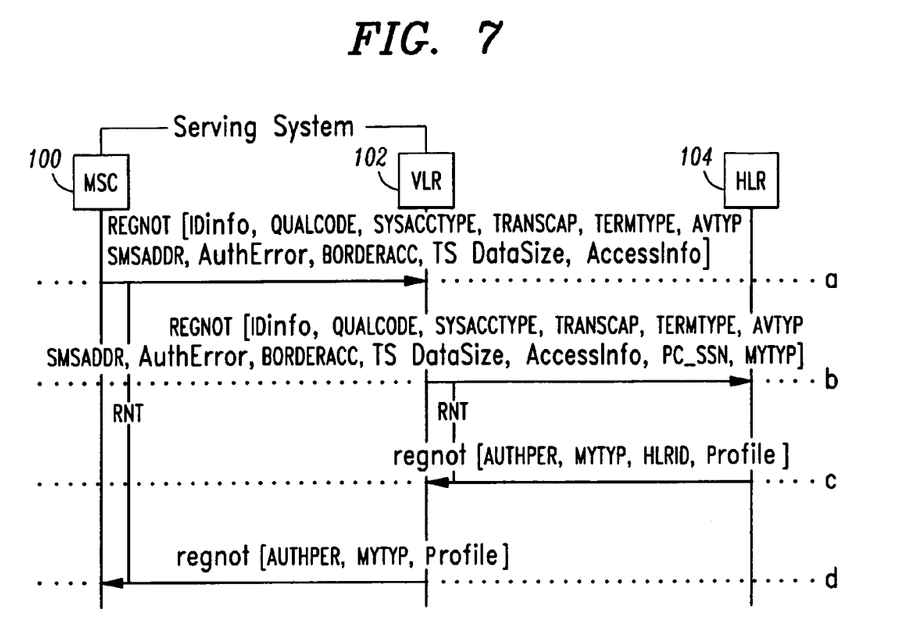
FIG. 7 is an information flow diagram showing a RegistrationNotification operation using a maximum teleservice payload size indicator in accordance with the invention.

This operation scenario describes a RegistrationNotification operation when confirmed at an HLR. A serving MSC determines that a roaming MS is within its service area. The serving MSC may detect the MS's presence through autonomous registration, call origination, call termination (i.e., a page response following a call to the roamer port) or a service order. As shown in step "a" of FIG. 7, the serving MSC 100 sends a REGNOT message to its VLR 102. The message, which is otherwise conventional, contains a TS_DataSize parameter in accordance with the invention, as follows:

| Parameters | Usage | Type |
|---|---|---|
| IDInfo: | Set of identification parameters in REGNOT: | |
| [MIN] | Served MS MIN. | R |
| [ESN] | Served MS ESN. | R |
| [MSCID] | Serving MSC MSCID. | R |
| [PC_SSN] | Serving MSC PC_SSN. Include if SS7 carriage services are used. | O |
| [LocationAreaID] | For paging served MS. Include if available. | O |
| [SystemMyTypeCode] | Serving MSC vendor identification. | MBC |
| QUALCODE | Type of qualification required. | R |
| SYSACCTYPE | Type of system access. | R |
| TRANSCAP | System's transaction capability | R |

-continued

| Parameters | Usage | Type |
|---|---|---|
| TERMTYP | Identifies the radio frequency interface standard supported by the associated MS | R |
| AVTYP | Indicates MS is unavailable for normal call delivery, if applicable. | O |
| SMSADDR | Temporary routing address of SMS subscriber, if applicable. | O |
| AuthError: | Parameters included if authentication parameters were requested by the Serving MSC but not received from the MS: | O |
| [SystemCapabilities] | Authentication capabilities of serving system. | |
| [ReportType] | Report of missing authentication parameters. | |
| BORDACC | Indicates that system access is in a border cell, as determined by local procedures. | O |
| TS DataSize | Maximum size of Teleservice payload | O |
| AccessInfo: | Subscriber's access information. Included if system access is in a border cell. Includes: | O |
| [ReceivedSignalQuality] | Raw received signal strength from MS for use in multiple access signal strength arbitration. | |
| [ControlChannelData] | Includes: DCC and CHNO of analog access channel for use in multiple access detection; CMAC for use in signal strength arbitration. | |
| [SystemAccessData] | Indicates the Serving MSC and cell site for use in multiple access detection. | |

The VLR 102 determines that either (a) the MS had previously registered with the MSC 100 (or another MSC within the domain of the VLR) but the MS has been reported inactive by the VLR 102, (b) the MS is not known to the VLR 102, or (c) the requested information cannot be made available for the indicated MS. Under these conditions, in step "b" of FIG. 7, the VLR 102 forwards the REGNOT message of step "a" of FIG. 7 to an HLR 104 associated with the MS, with the following additional conventional parameters:

| Parameters | Usage | Type |
|---|---|---|
| [PC_SSN] | Serving VLR PC_SSN. Include if SS7 carriage services are used. | O |
| [MYTYP] | Serving VLR vendor identification. | MBC |

The HLR 104 determines that authorization can be granted to the MS. In step "c" of FIG. 7, it returns the requested information to the VLR 102 in a regnot message containing the same parameters as in step "b" of FIG. 7, with the following conventional additions and modifications:

| Parameters | Usage | Type |
|---|---|---|
| HLRID [MSCID] | HLR MSCID to key MS record against for a subsequent UnreliableRoamerDataDirective. | R |
| MYTYP | HLR vendor identification. | MBC |

In step "d" of FIG. 7, the VLR 102 forwards the regnot message to the MSC 100 using the same parameters as in step "c" of FIG. 7, with the following conventional modification:

| Parameters | Usage | Type |
|---|---|---|
| MYTYP | VLR vendor identification. | MBC |

EXAMPLE 7

Successful SMSNotification

Figure 8:
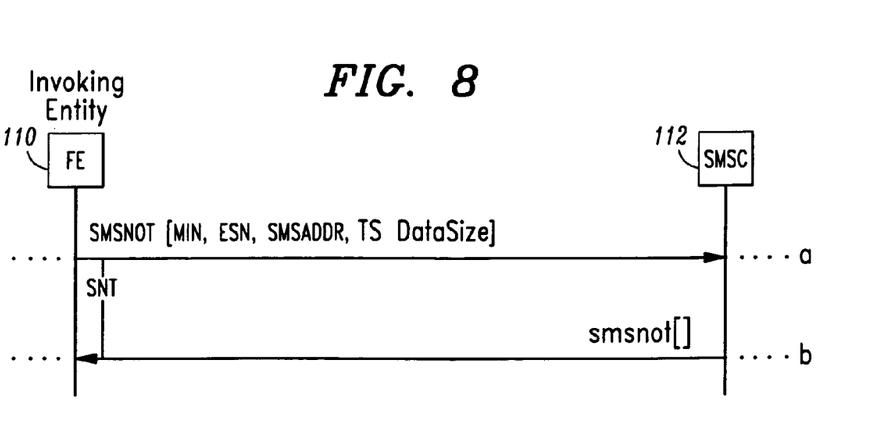
FIG. 8 is an information flow diagram showing an SMSNotification operation using a maximum teleservice payload size indicator in accordance with the invention.

This scenario describes the successful use of an SMSNotification operation, conveying to an SMSC the SMS_Address of an MS-based Short Message Entity (SME). The invoking Functional Entity (FE) such as an MSC, an HLR, etc., detects a change of an MS's status or location indicating the availability of an MS-based SME. As shown in step "a" of FIG. 8, the invoking FE 110 may send an SMSNOT message to the responsible SMSC 112. If the FE 110 has a pending request for the address of an MS-based SME, it must respond. The message, which is otherwise conventional, includes a TS_DataSize parameter in accordance with the invention, as follows:

| Parameters | Usage | Type |
|---|---|---|
| MIN | Used to identify the MS. | R |
| ESN | Used to identify the MS. | R |
| SMSADDR | Temporary routing address that can be used to deliver one or more short messages to the indicated MS. | R |
| TS DataSize | Maximum size of Teleservice payload | O |

As shown in step "b" of FIG. 8, the SMSC 112 confirms the receipt of the address by returning an smsnot message to the FE 110.

EXAMPLE 8

Successful SMSRequest

Figure 9:
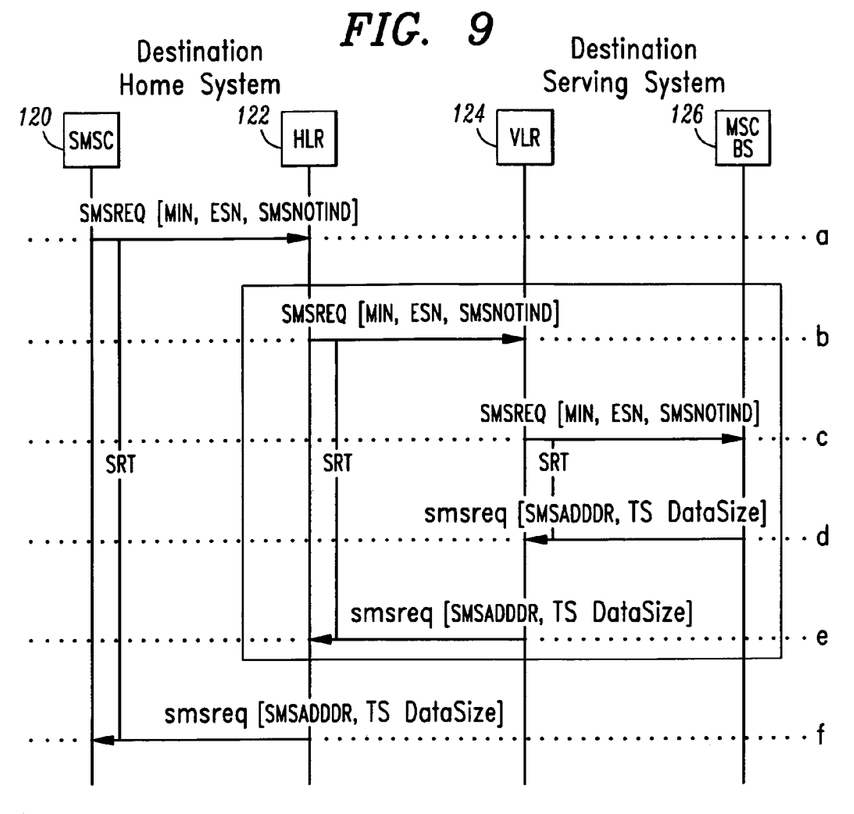
FIG. 9 is an information flow diagram showing an SMSRequest operation using a maximum teleservice payload size indicator in accordance with the invention.

This scenario describes the successful use of an SMSRequest operation, resulting in the return of the SMS_Address of an MS-based SME to an SMSC. As shown in step "a" of FIG. 9, an SMSC 120 does not have the current network address of the indicated MS-based SME, and it sends an SMSREQ message toward an HLR 122 associated with the MS (possibly using SCCP global title translation of the MIN). The message parameters are conventional:

| Parameters | Usage | Type |
|---|---|---|
| MIN | Used to identify the MS. | R |
| ESN | Used to identify the MS. | O |
| SMSNOTIND | Include if a notification of MS availability is not required. | O |

If the HLR 122 has the current address of the indicated MS-based SME, an smsreq message in accordance with step "f" of FIG. 9 is sent from the HLR 122 to the SMSC 120. Otherwise, as shown in step "b" of FIG. 9, the HLR 122 forwards the SMSREQ message toward a VLR 124 serving the addressed MS-based SME. The message parameters are the same as in step "a" of FIG. 9.

In step "c" of FIG. 9, the VLR 124 forwards the SMSREQ message toward an MSC 126 serving the addressed MS-based SME. The parameters are the same as in step "a" of FIG. 9.

As shown in step "d" of FIG. 9, the MSC 1226 returns an smsreq message to the VLR 124 indicating the current network address that can be associated with the indicated MS-based SME. The message parameters, which are otherwise conventional, include a TS_DataSize in accordance with the invention, as follows:

| Parameters | Usage | Type |
|---|---|---|
| SMSADDR | Temporary routing address that can be used to deliver one or more short messages to the indicated MS. | R |
| TS DataSize | Maximum size of Teleservice payload | O |

In step "e" of FIG. 9, the VLR 124 forwards the smsreq message to the HLR 122. The parameters are the same as in step "d" of FIG. 9.

In step "f" of FIG. 9, the HLR 122 sends the smsreq to the SMSC 120. The parameters are the same as in step "d" of FIG. 9.

EXAMPLE 9

Successful TransferToNumberRequest

Figure 10:
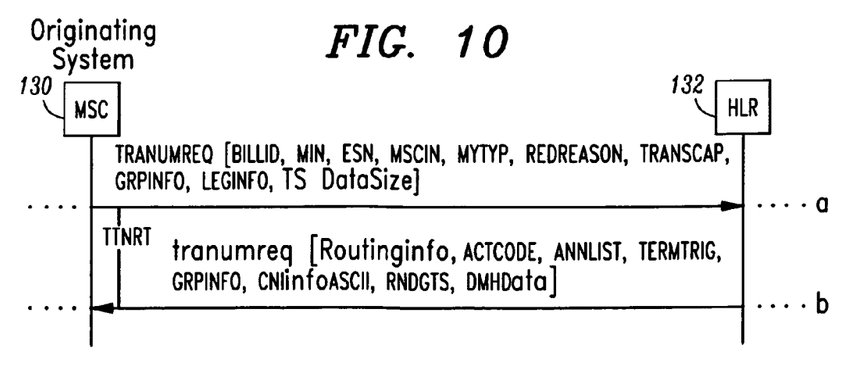
FIG. 10 is an information flow diagram showing a TransferToNumberRequest operation using a maximum teleservice payload size indicator in accordance with the invention.

This operation scenario describes a normal TransferToNumberRequest operation. As shown in step "a" of FIG. 10, an originating MSC 130 sends a TRANUMREQ message to an HLR 132 associated with an MS (not shown), including an indication of the feature responsible for redirecting the call (e.g., CFB). The message parameters, which are otherwise conventional, include a TS_DataSize parameter in accordance with the invention, as follows:

| Parameters | Usage | Type |
|---|---|---|
| BILLID | Originating BillingID, required to identify instances of Flexible Alerting | |
| MIN | Served MS MIN. | R |
| ESN | Served MS ESN. | R |
| MSCIN | Include for IS-41-C or later. | O |
| MYTYP | Originating MSC vendor identification. | MBC |
| REDREASON | Identifies reason for the TRANUMREQ. | R |
| TRANSCAP | Indicates the originating system's transaction capability at the current time. | R |
| GRPINFO | Information associated with group routing. Include if available | O |
| LEGINFO | Identifies a leg in a multiple termination call. Include if available. | O |
| TS DataSize | Maximum size of Teleservice payload | O |

As shown in step "b" of FIG. 10, the HLR 130 determines the forward-to number for redirecting the call and returns this to the MSC 130 in a tranumreq message. The parameters of this message are as follows:

| Parameters | Usage | Type |
|---|---|---|
| RoutingInfo: | Call routing information: | |
| [TerminationList] | Network termination information. Include if TerminationList is allowed. | O |
| [Digits(Destination)] | PSTN DN for use in call routing. Include if TerminationList is not allowed. | O |
| [Digits(Carrier)] | Called subscriber's PIC. Include if applicable and if not specified within the TerminationList parameter. | O |
| ACTCODE | Include if action to be performed is not implied through presence of other parameters. | O |
| ANNLIST | List of tones or announcements to play. If not included, announcement is based on other parameters in response. | O |
| TERMTRIG | Termination trigger points currently active for the subscriber. Include if applicable. | O |
| GRPINFO | Identifies the new leg in a multiple termination call. Include if applicable. | O |
| CNIinfoASCII: | CNI information including digits parameters in ASCII format. Include as applicable: | |
| [CallingPartyNumber-String1] | Calling number digits (network-provided), incl. Presentation restriction information. | O |
| [CallingPartyNumber-String2] | Calling number digits (user-provided), incl. Presentation restriction information. | O |
| [RedirectingNumber-String] | Redirecting number digits, incl. Presentation restriction information. | O |
| [CallingPartySub-address] | Calling number subaddress (user-provided). | O |
| [RedirectingSub-address] | Redirecting number subaddress. | O |
| RNDGTS | Redirecting number digits in BCD format. May include if call is to be redirected out of the Originating MSC. | O |
| DMHData: | Data for DMH recording purposes: | |
| [DMH_AccountCode-Digits] | Include if applicable. | O |
| [DMH_Alternate-BillingDigits] | Include if applicable. | O |
| [DMH_BillingDigits] | Include if applicable. | O |
| [DMH_Redirection-Indicator] | Reason for extending the incoming call. Include for recording purposes. | R |
| [MobileDirectory-Number] | Include if applicable. | O |

Accordingly, a system and method have been described for providing an indication of maximum teleservice payload size in a wireless communication system. While various embodiments of the invention have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for providing improved teleservice messaging to a mobile station in a wireless communication network, comprising the steps of:
receiving at a network sending entity an indication of the maximum teleservice payload size that can be sent by said network sending entity to said mobile station via network receiving entities serving said mobile station;
utilizing said payload size indication at said network sending entity to format the size of teleservice messages sent by said network sending entity to said mobile station via said network receiving entities; and
said payload size indication being originated from one of said network receiving entities as a message parameter during standard registration message exchange involving said one network receiving entity.

2. A method in accordance with claim 1 wherein said payload size indication is passed during standard registration message exchange from said one network receiving entity to a database associated with said mobile station, and wherein said payload size indication is passed during standard registration message exchange from said database to said network sending entity.

3. A method in accordance with claim 2 wherein said database is a Home Location Register (HLR).

4. A method in accordance with claim 2 wherein said standard registration message exchange includes one of an Authentication On Initial Access message exchange, a Direct FeatureRequest With Call Routing message exchange, a LocationRequest message exchange, an OriginationRequest message exchange, a QualificationRequest message exchange, a RegistrationNotification message exchange, or a TransferToNumberRequest message exchange.

5. A method in accordance with claim 1 wherein said payload size indication is passed during standard registration message exchange from said one network receiving entity to said network sending entity.

6. A method in accordance with claim 5 wherein said standard registration message exchange includes one of an SMSNotification message exchange or an SMSRequest message exchange.

7. A method in accordance with claim 1 wherein said one network receiving entity is a Mobile Switching Center (MSC).

8. A method in accordance with claim 1 wherein said one network receiving entity is a Mobile Data Intermediate System (MDIS).

9. A method in accordance with claim 1 wherein said one network receiving entity is a Serving GPRS Support Node (SGSN).

10. A method in accordance with claim 1 wherein said network sending entity is one of a Short Message Service Center (SMSC), a Message Center (MC) or a Wireless Application Protocol (WAP) server.

11. A system for providing improved teleservice messaging to a mobile station in a wireless communication network, comprising:
means for receiving at a network sending entity an indication of the maximum teleservice payload size that can be sent by said network sending entity to said mobile station via network receiving entities serving said mobile station;
means for utilizing said payload size indication at said network sending entity to format the size of teleservice messages sent by said network sending entity to said mobile station via said network receiving entities; and
means for originating said payload size indication from one of said network receiving entities as a message parameter during standard registration message exchange involving said one network receiving entity.

12. A system in accordance with claim 11 wherein said originating means is adapted to pass said payload size indication during standard registration message exchange from said one network receiving entity to a database associated with said mobile station, and wherein said receiving means is adapted to receive said payload size indication during standard registration message exchange from said database to said network sending entity.

13. A system in accordance with claim 12 wherein said database is a Home Location Register (HLR).

14. A system in accordance with claim 12 wherein said standard registration message exchange includes one of an Authentication On Initial Access message exchange, a Direct FeatureRequest With Call Routing message exchange, a LocationRequest message exchange, an OriginationRequest message exchange, a QualificationRequest message exchange, a RegistrationNotification message exchange, or a TransferToNumberRequest message exchange.

15. A system in accordance with claim 11 wherein said receiving means is adapted to receive said payload size indication during standard registration message exchange from said one network receiving entity to said network sending entity.

16. A system in accordance with claim 15 wherein said standard registration message exchange includes one of an SMSNotification message exchange or an SMSRequest message exchange.

17. A system in accordance with claim 11 wherein said one network receiving entity is a Mobile Switching Center (MSC).

18. A system in accordance with claim 11 wherein said one network receiving entity is a Mobile Data Intermediate System (MDIS).

19. A system in accordance with claim 11 wherein said one network receiving entity is a Serving GPRS Support Node (SGSN).

20. A system in accordance with claim 11 wherein said network sending entity is one of a Short Message Service Center (SMSC), a Message Center (MC) or a Wireless Application Protocol (WAP) server.

21. A method for providing improved teleservice messaging to a mobile station in a wireless communication network, comprising the steps of:
    providing to a network sending entity an indication of the maximum teleservice payload size that can be sent by said network sending entity to said mobile station via network receiving entities serving said mobile station;
    said maximum teleservice payload size indication being utilizable by said sending network entity to format the size of teleservice messages sent by said network sending entity to said mobile station via said network receiving entities; and
    said payload size indication being originated from one of said network receiving entities as a message parameter during standard registration message exchange involving said one network receiving entity.

22. A method in accordance with claim 21 wherein said payload size indication is passed during standard registration message exchange from said one network receiving entity to a database associated with said mobile station, and wherein said payload size indication is passed during standard registration message exchange from said database to said network sending entity.

23. A method in accordance with claim 22 wherein said database is a Home Location Register (HLR).

24. A method in accordance with claim 22 wherein said standard registration message exchange includes one of an Authentication On Initial Access message exchange, a Direct FeatureRequest With Call Routing message exchange, a LocationRequest message exchange, an OriginationRequest message exchange, a QualificationRequest message exchange, a RegistrationNotification message exchange, or a TransferToNumberRequest message exchange.

25. A method in accordance with claim 21 wherein said payload size indication is passed during standard registration message exchange from said one network receiving entity to said network sending entity.

26. A method in accordance with claim 25 wherein said standard registration message exchange includes one of an SMSNotification message exchange or an SMSRequest message exchange.

27. A method in accordance with claim 21 wherein said one network receiving entity is a Mobile Switching Center (MSC).

28. A method in accordance with claim 21 wherein said one network receiving entity is a Mobile Data Intermediate System (MDIS).

29. A method in accordance with claim 21 wherein said one network receiving entity is a Serving GPRS Support Node (SGSN).

30. A method in accordance with claim 21 wherein said network sending entity is one of a Short Message Service Center (SMSC), a Message Center (MC) or a Wireless Application Protocol (WAP) server.

31. A system for providing improved teleservice messaging to a mobile station in a wireless communication network, comprising:
    means for providing to a network sending entity an indication of the maximum teleservice payload size that can be sent by said network sending entity to said mobile station via network receiving entities serving said mobile station;
    said maximum teleservice payload size indication being utilizable by said sending network entity to format the size of teleservice messages sent by said network sending entity to said mobile station via said network receiving entities; and
    means for originating said payload size indication from one of said network receiving entities as a message parameter during standard registration message exchange involving said one network receiving entity.

32. A system in accordance with claim 31 wherein said originating means is adapted to provide said payload size indication during standard registration message exchange from said one network receiving entity to a database associated with said mobile station, and wherein said providing means is adapted to provide said payload size indication during standard registration message exchange from said database and said network sending entity.

33. A system in accordance with claim 31 wherein said database is a Home Location Register (HLR).

34. A system in accordance with claim 32 wherein said standard registration message exchange includes one of an Authentication On Initial Access message exchange, a Direct FeatureRequest With Call Routing message exchange, a LocationRequest message exchange, an OriginationRequest message exchange, a QualificationRequest message exchange, a RegistrationNotification message exchange, or a TransferToNumberRequest message exchange.

35. A system in accordance with claim 31 wherein said providing means is implemented using said originating means to provide said payload size indication from said one network receiving entity during standard registration message exchange between said one network receiving entity and said network sending entity.

36. A system in accordance with claim 35 wherein said standard registration message exchange includes one of an SMSNotification message exchange or an SMSRequest message exchange.

37. A method in accordance with claim 31 wherein said one network receiving entity is a Mobile Switching Center (MSC).

38. A system in accordance with claim 31 wherein said one network receiving entity is a Mobile Data Intermediate System (MDIS).

39. A system in accordance with claim 31 wherein said one network receiving entity is a Serving GPRS Support Node (SGSN).

40. A system in accordance with claim 31 wherein said network sending entity is one of a Short Message Service Center (SMSC), a Message Center (MC) or a Wireless Application Protocol (WAP) server.

41. In a wireless communication system, a method for providing improved teleservice messaging to a mobile station communicating through the wireless communication system, comprising the steps of:

receiving at a network sending entity an indication of the maximum teleservice payload size that can be sent by said network sending entity to said wireless station via network receiving entities serving said mobile station;

utilizing said payload size indication at said network sending entity to format the size of teleservice messages sent by said network sending entity to said mobile station via said network receiving entities;

said receiving step including receiving said payload size indication from one of said network receiving entities at said network sending entity via a database associated with said mobile station; and said receiving step further including first receiving said payload size indication at said database and thereafter at said network sending entity during standard registration message exchange between one of said network receiving entities and said database, and between said database and said network sending entity, respectively, during operations of said wireless communication system.

42. In a wireless communication system, a method for providing improved teleservice messaging to a mobile station communicating through the wireless communication system, comprising the steps of:

providing to a network sending entity an indication of the maximum teleservice payload size that can be sent by said network sending entity to said wireless station via network receiving entities serving said mobile station;

said payload size indication being utilizable at said network sending entity to format the size of teleservice messages sent by said network sending entity to said mobile station via said network receiving entities;

said providing step including providing said payload size indication from one of said network receiving entities to said network sending entity via a database associated with said mobile station; and said providing step further including providing said payload size indication to said database and to said network sending entity during standard registration message exchange between one of said network receiving entities and said database, and between said database and said network sending entity, respectively, during operations of said wireless communication system.

* * * * *